(12) United States Patent
Bogucki

(10) Patent No.: US 8,874,374 B2
(45) Date of Patent: Oct. 28, 2014

(54) OPTICAL TURBULENCE SENSOR

(76) Inventor: Darek J. Bogucki, Corpus Christi, TX (US)

(*) Notice: Subject to any disclaimer, the term of this patent is extended or adjusted under 35 U.S.C. 154(b) by 445 days.

(21) Appl. No.: 13/200,226

(22) Filed: Sep. 21, 2011

(65) Prior Publication Data

US 2012/0078517 A1    Mar. 29, 2012

Related U.S. Application Data

(60) Provisional application No. 61/404,074, filed on Sep. 28, 2010.

(51) Int. Cl.
| | |
|---|---|
| *G01W 1/00* | (2006.01) |
| *G01F 1/00* | (2006.01) |
| *G01F 23/00* | (2006.01) |
| *G01R 23/16* | (2006.01) |
| *G01K 1/00* | (2006.01) |
| *G01K 11/30* | (2006.01) |
| *G01K 17/00* | (2006.01) |
| *G01S 17/88* | (2006.01) |

(52) U.S. Cl.
CPC . *G01W 1/00* (2013.01); *G01S 17/88* (2013.01)
USPC ...... 702/3; 702/49; 702/50; 702/77; 702/130; 702/134; 702/136

(58) Field of Classification Search
CPC ........... G01S 17/89; G01S 17/88; G01W 1/00
USPC ................ 702/2, 3, 50, 49, 77, 130, 134, 136
See application file for complete search history.

(56) References Cited

U.S. PATENT DOCUMENTS

| | | |
|---|---|---|
| 5,865,871 A | 2/1999 | Simundich |
| 7,283,426 B2 | 10/2007 | Grasso |

OTHER PUBLICATIONS

D.J. Bogucki. Optical measurement of rated of dissipation of temperature variance due to oceanic turbulence., Optics Express. Jun. 11, 2007. pp. 7224-7230.*
R. V. Ozmidov, "Vertical Exchange in the Ocean." Phys. Oceanogr., vol. 9, No. 6, pp. 417-425 (1998).
W. H. Wells, "Theory of Small-angle Scattering." (Advisory Group for Aerospace Research and Development, NATO, 92 Neuilly-Sur-Seine, France, 1973).
D. Bogucki et al., Comparison of Nearforward Scattering on Turbulence and Particles. Applied Optics 37, 4669-4677 (1998).
D.J. Bogucki et al., "Light Scattering on Oceanic Turbulence," Appl, Opt. 43, 5662-5676 (2004).
D. J. Bogucki et al., "Near-forward Light Scattering on Oceanic Turbulence and Particulates: An Experimental Comparison," vol. SPIE, Ocean Optics XIV (1998).

(Continued)

*Primary Examiner* — Michael Nghiem
*Assistant Examiner* — Yoshihisa Ishizuka

(57) ABSTRACT

A method and system for determining a rate of turbulent kinetic energy dissipation (TKED) in a turbulent fluid environment are provided. A light source provided at a first end of a predetermined path-length passes a beam of light through the turbulent fluid environment. An angle of arrival detection unit detects the angle of arrival of the at least one beam of light. The angle of arrival is then processed at a processing unit that calculates temperature dissipation spectra as a function of the autocorrelation of the angle of arrival. The peak of the temperature dissipation spectra represents the rate of TKED. A number of turbulent quantities can be determined by using the method and system.

17 Claims, 6 Drawing Sheets

(56) References Cited

OTHER PUBLICATIONS

R. G. Lueck et al., "Turbulence Measurement with a Moored Instrument," Journal of Atmospheric and Oceanic Technology 14, 143-161 (1997).

M. C. Gregg, "Uncertainties and Limitations in Measuring $\epsilon$ and $\chi_T$" Journal of Atmospheric and Oceanic Technology 16, 1484-1490(1998).

V. I. Tatarski, "The Effects of the Turbulent AAtmosphere on the Wave Propagation" (Israel Program for Scientific Translation, Jerusalem (1971).

A. S. Monin et al., "Statistical Fluid Mechanics • Mechanics of Turbulence", The MIT Press (1981).

D. Bogucki et al., "Direct Numerical Simulations of Passive Scalars With Pr> 1 Advected by Turbulent Flow," J Fluid Mech. 343, 111-130 (1997).

D. Bogucki et al., "Numerical Study of Light Scattering by a Boundary-Layer Flow," Appl. Opt. 44, 5286-5291 (2005).

A. S. Monin et al., "Turbulence in the Ocean," D. Reidel Publishing Company; 50-61 (1985).

\* cited by examiner

OPTICAL TURBULENCE SENSOR

CROSS REFERENCE TO RELATED APPLICATIONS

This application claims priority of U.S. Provisional Patent Application Ser. No. 61/404,074, titled "Optical Turbulence Sensor (OTS)", filed on Sep. 28, 2010, entire contents of which are herein incorporated by reference.

BACKGROUND

1. Field of the Invention

The present invention generally relates to the field of sensors and their applications. More particularly, the present invention relates to optical sensors used in turbulence measurements.

2. Description of the Related Art

Most fluid flows, including water air and gas flows are turbulent and therefore characterized by a wide range of coexisting scales of motion, from fraction of millimeter to meters or even kilometers. Increased turbulence in a fluid flow results in an increase in energy dissipation, mixing, heat transfer and drag experienced by an object moving through the fluid. In a three dimensional fluid flow, turbulent kinetic energy (TKE) is produced by large-scale forcing such as shear stresses, buoyancy effects, waves, pressure etc. TKE is the mean kinetic energy per unit mass associated with eddies of all scales of the flow. Intensity of turbulence can be derived from TKE. TKE is one of the most fundamental parameter in turbulence measurement.

Because of the ubiquity of turbulent flows in everyday experience, detection and measurement of turbulence plays a crucial role in human lives as well as in engineering and science. The applications of turbulence measurement techniques are as vast as the ubiquity of turbulent processes—for example: airplanes safety, weather forecast, climate prediction, hurricane forecasting, sewage and water management systems, oceanography, wind turbines, and so forth.

Turbulence plays a crucial role in transport of the heat, momentum, and energy of the ocean and the atmosphere. Oceanic turbulence measurement attempts date back to 1950s, when researchers first developed profilers/sensors to detect the presence of submarines in the ocean. Since then, many oceanographic sensors have been developed and their use has revealed numerous features of oceanic processes. In addition, a number of SONAR techniques have also been developed for oceanic turbulence measurements.

U.S. Pat. No. 7,283,426, assigned to BAE Systems Information and Electronic Systems Integration Inc. discloses a heterodyne method for detecting, tracking and locating submarines by utilizing pulsed coherent radiation from a laser projected down a water column. Flow rate is obtained by correlating it with the flow mean quantity. The output is a characterization of particle movement which in turn is used for detecting and tracking submarines. This is an indirect method of turbulence characterization. It is believed that this method would not be applicable in the absence of oceanic particles. Further, the method is applicable to oceanographic turbulence detection only; it does not seem to be applicable in other forms of turbulence measurements, for example, in air turbulence measurement.

Existing oceanographic turbulence sensors directly measuring turbulent parameters, such as those developed by Rockland Scientific Inc., use modified piezoelectric sensors. These sensors entail high cost of manufacturing and maintenance. They also require mean steady flow of water for accurate turbulence measurement. The sensor is too fragile to be used in high speed applications and under rough weather conditions. In addition, the sensor cannot be used if the sensor is not moving through the flow.

Wake turbulence is the turbulence that forms behind an aircraft as it passes through the air. It is especially hazardous during the landing and take-off phases of flight, and therefore measurement of wake turbulence plays an important role in successful designing of aircrafts and their hazard prevention systems. A number of commercial techniques have been developed for air turbulence measurement in aircrafts. Examples of these techniques include Doppler Light Detection and Ranging (LIDAR), interferometers, bistatic radars, and so forth. These techniques also suffer from one or more disadvantages of existing systems discussed above.

In light of the foregoing, there exists a need to provide a direct method and system for detecting and measuring turbulence in a turbulent environment. The method should be versatile, direct, and noninvasive, i.e., it should be applicable for a number of turbulent environments and physical or weather conditions. Moreover, the system should be able to measure various turbulence related parameters with minimal data processing.

SUMMARY

An object of the present invention is to provide a method and system for direct determination of one or more turbulent quantities in a turbulent fluid environment.

Another object of the present invention is to provide a system for turbulence measurement that involves minimum and inexpensive hardware, and is therefore cost effective.

Yet another object of the present invention is to provide a method and system that is non-invasive and applicable in a number of turbulent fluid environments and under varying physical conditions.

Yet another object of the present invention is to provide a method and system that is able to measure various turbulence related parameters with minimal data processing.

Embodiments of the invention provide a method for determining a rate of turbulent kinetic energy dissipation (TKED) in a turbulent fluid environment. An autocorrelation of an angle of arrival of light passing through the turbulent fluid environment, along a predetermined path-length (L) is obtained. A temperature dissipation spectrum is calculated as a function of the autocorrelation of the angle of arrival of light. The peak of the temperature dissipation spectra represents the rate of TKED.

An embodiment of the present invention provides a method for determining a rate of turbulent kinetic energy dissipation (TKED) in a turbulent fluid environment. An autocorrelation of an angle of arrival of light $\phi^2(d)$ passing through the turbulent fluid environment, along a predetermined path-length (L), is obtained by using the equation:

$$\varphi^2(d) = \text{Constant1} * \int_0^{2\pi} d\theta \cdot \sin\theta \cdot VSF(\theta) \cdot g_\varphi(\theta) \cdot J_0\left(\frac{2\pi}{\lambda} d \sin(\theta)\right)$$

where $VSF(\theta)$ is a volume scattering function obtained as a function of a time series of a scattering angle of light. Here, in context of the volume scattering function, the scattering angle $\theta$ and the angle of arrival of the beam of light are synonymous. $g_\phi(\theta)$ is a fudge function obtained by using historical turbulence measurement data. A temperature spectra $E_\theta(k)$ as a function of the angle of arrival of light $\phi^2(d)$ is calculated by using the equation:

$$E_\theta(k) = \text{Constant2} * \int_k^\infty k_1 \frac{\frac{d}{dk_1}\left(\frac{\Phi(k_1)}{k_1}\right)}{\sqrt{k_1^2 - k_2}} dk_1$$

Where $\Phi(k_1)$ is a Fourier transform of the autocorrelation of the angle of arrival of light, and wherein the peak of the temperature dissipation spectra represents the rate of TKED.

Another embodiment of the present invention provides a system for determining a rate of turbulent kinetic energy dissipation (TKED) in a turbulent fluid environment. The system includes a light source provided at a first end of a predetermined path-length (L), for passing a beam of light through the turbulent fluid environment. An angle of arrival detection unit detects the angle of arrival of the at least one beam of light. The angle of arrival is then processed at a processing unit that calculates temperature dissipation spectra as a function of the autocorrelation of the angle of arrival. The peak of the temperature dissipation spectra represents the rate of TKED.

Yet another embodiment of the present invention provides a single lenslet, single arrival angle turbulence sensor. The sensor includes a light source provided at a first end of a predetermined path-length (L), for passing a beam of light through the turbulent fluid environment. The sensor further includes an angle of arrival detection unit. The angle of arrival detection unit includes a single lenslet positioned at a second end of the predetermined path-length; and an imaging unit for imaging the beam of light after it passes through the lenslet. The angle of arrival is then processed at a processing unit that obtains an autocorrelation of an angle of arrival of the beam of light $\phi^2(d)$ passing through the turbulent fluid environment and along the predetermined path-length (L), by using the equation:

$$\varphi^2(d) = \text{Constant1} * \int_0^{2\pi} d\theta \cdot \sin\theta \cdot VSF(\theta) \cdot g_\varphi(\theta) \cdot J_0\left(\frac{2\pi}{\lambda} d \sin(\theta)\right)$$

where $VSF(\theta)$ is a volume scattering function obtained as a function of a time series of a scattering angle of the beam of light and $g_\varphi(\theta)$ is a fudge function obtained by using historical turbulence measurement data. The processing unit further calculates temperature spectra $E_\theta(k)$ as a function of the angle of arrival of the beam of light by using the equation:

$$E_\theta(k) = \text{Constant2} * \int_k^\infty k_1 \frac{\frac{d}{dk_1}\left(\frac{\Phi(k_1)}{k_1}\right)}{\sqrt{k_1^2 - k_2}} dk_1$$

where $\Phi(k_1)$ is a Fourier transform of the autocorrelation of the angle of arrival of the beam of light. The system further includes a memory for storing the parameters associated with the method of the present invention, a power source for powering the processing unit and the imaging unit, and a transmission cable arrangement for transferring data between the imaging unit and the processing unit.

BRIEF DESCRIPTION OF DRAWINGS

The features of the present invention, which are believed to be novel, are set forth with particularity in the appended claims. Embodiments of the present invention will hereinafter be described in conjunction with the appended drawings provided to illustrate and not to limit the scope of the claims, wherein like designations denote like elements, and in which:

DETAILED DESCRIPTION OF EMBODIMENTS

Figure 1:
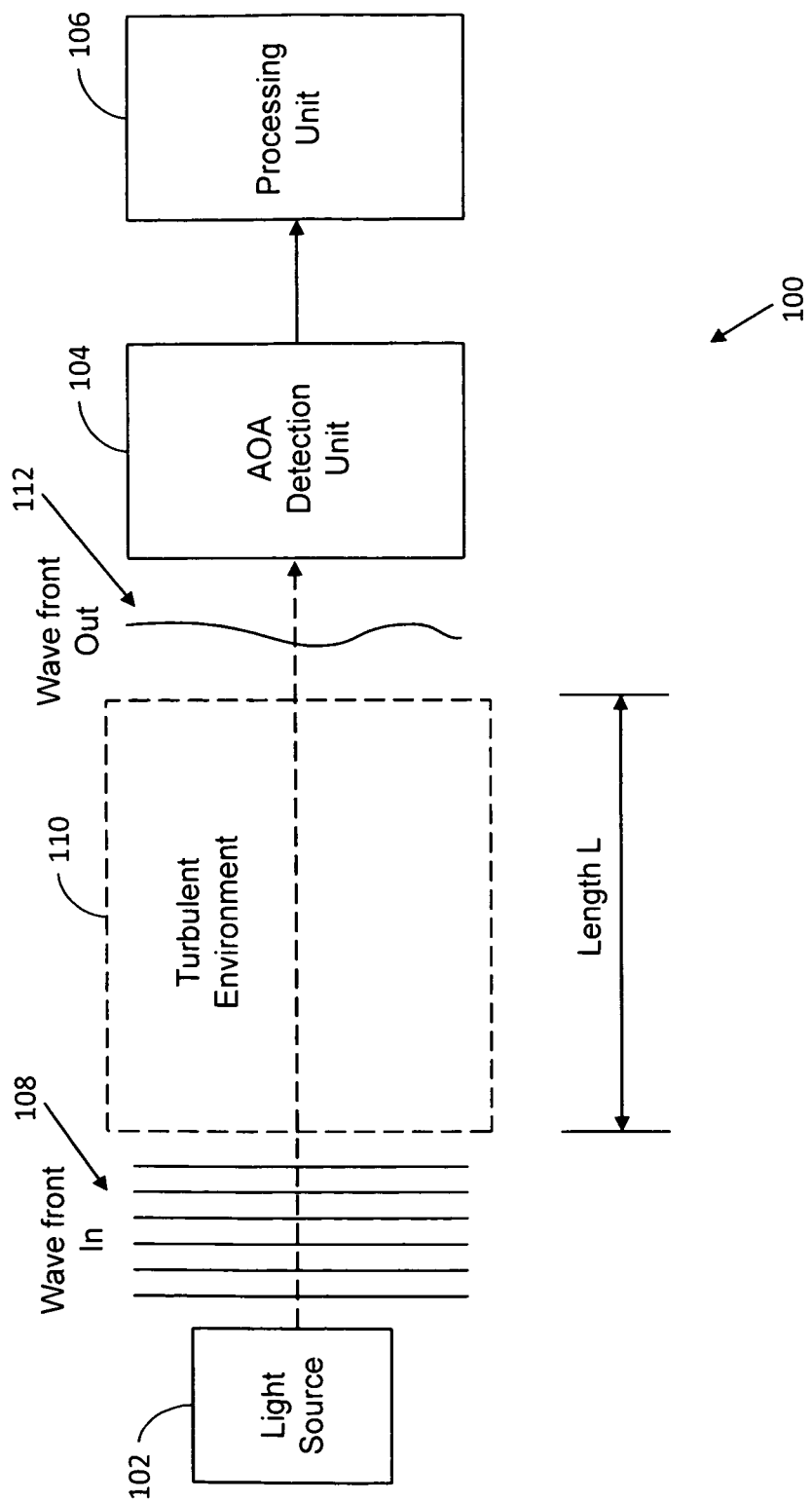
FIG. 1 is a block diagram illustrating a system for determining a rate of turbulent kinetic energy dissipation (TKED) in a turbulent fluid environment, in accordance with an embodiment of the present invention.

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention.

There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of method steps and system components related to a method for determining a rate of turbulent kinetic energy dissipation (TKED) in a turbulent fluid environment. Accordingly, the system components and the method steps have been represented where appropriate by conventional symbols in the drawings, showing only specific details that are pertinent for an understanding of the present invention so as not to obscure the disclosure with details that will be readily apparent to those with ordinary skill in the art having the benefit of the description herein.

While the specification concludes with the claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Inhomogeneities in the refractive index induced by the temperature fluctuations in a turbulent flow have an effect of scattering light in near-forward angles. The present invention is based on the physics of near-forward light scattering on a turbulent fluid parcel. In an embodiment of the present invention, an optical method is used to estimate temperature dissipation spectra based on a spatial autocorrelation of the angle of arrival of a light beam, after it passes through a turbulent fluid medium. Light propagating along the z-axis undergoes a phase change $\Phi(r)$ expressed as:

$$\Phi(r) = \int_0^z n(x, y, z)\, dz$$

where $n(x, y, z) \sim T(x, y, z)$ is the spatially varying index of refraction, typically a function of only the temperature of the turbulent environment.

A scalar, near-forward approximation to Maxwell's equations for a short propagation path can be expressed by the Helmholtz equation:

$$(\nabla^2 + k^2)E = -2k^2 \cdot n(r) \cdot E$$

where E is Cartesian component of electric field vector, k is light wavenumber, and n(r) is the deviation of local refractive index from its mean. The transformation $E = \psi e^{(ikz)}$ reduces the problem to the parabolic (diffusion like) Helmholtz equation (valid up to few degrees of the scattering angle of light):

$$2ik\frac{\partial \psi}{\partial z} + \nabla_T^2 \psi + 2k^2 n(r)\psi = 0$$

and $$\nabla_T^2 = \frac{\partial^2}{\partial x^2} + \frac{\partial^2}{\partial y^2}$$

In a turbulent environment such as an ocean, the T(r) fluctuations dominate the index of refraction and: n(r)=Constant*T(r). For short propagation distances (~1 m):

$$\psi(x,y,z) = A_0 e^{i \cdot k \cdot \text{Constant} \int_0^z T(x,y,z')\,dz'}$$

where $A_o$ is the initial value of $\psi(x, y)$ at z=0 and the Constant takes a value of $$\frac{2\pi}{\lambda},$$

and $\lambda$ is the wavelength of light. This is the geometrical optics approximation and $\psi(x, y, L)$ allows to calculate the angle of arrival of the light beam, such that the vector normal to $$\left[\frac{\partial \Phi}{\partial x}, \frac{\partial \Phi}{\partial y}, 1\right]$$

is parallel to the angle of arrival of light–$\alpha$ and the angle of arrival of light can be found by using the equation:

$$\alpha = \left(\frac{\partial \Phi^2}{\partial x} + \frac{\partial \Phi^2}{\partial y}\right)^{1/2}$$

Figure 2:
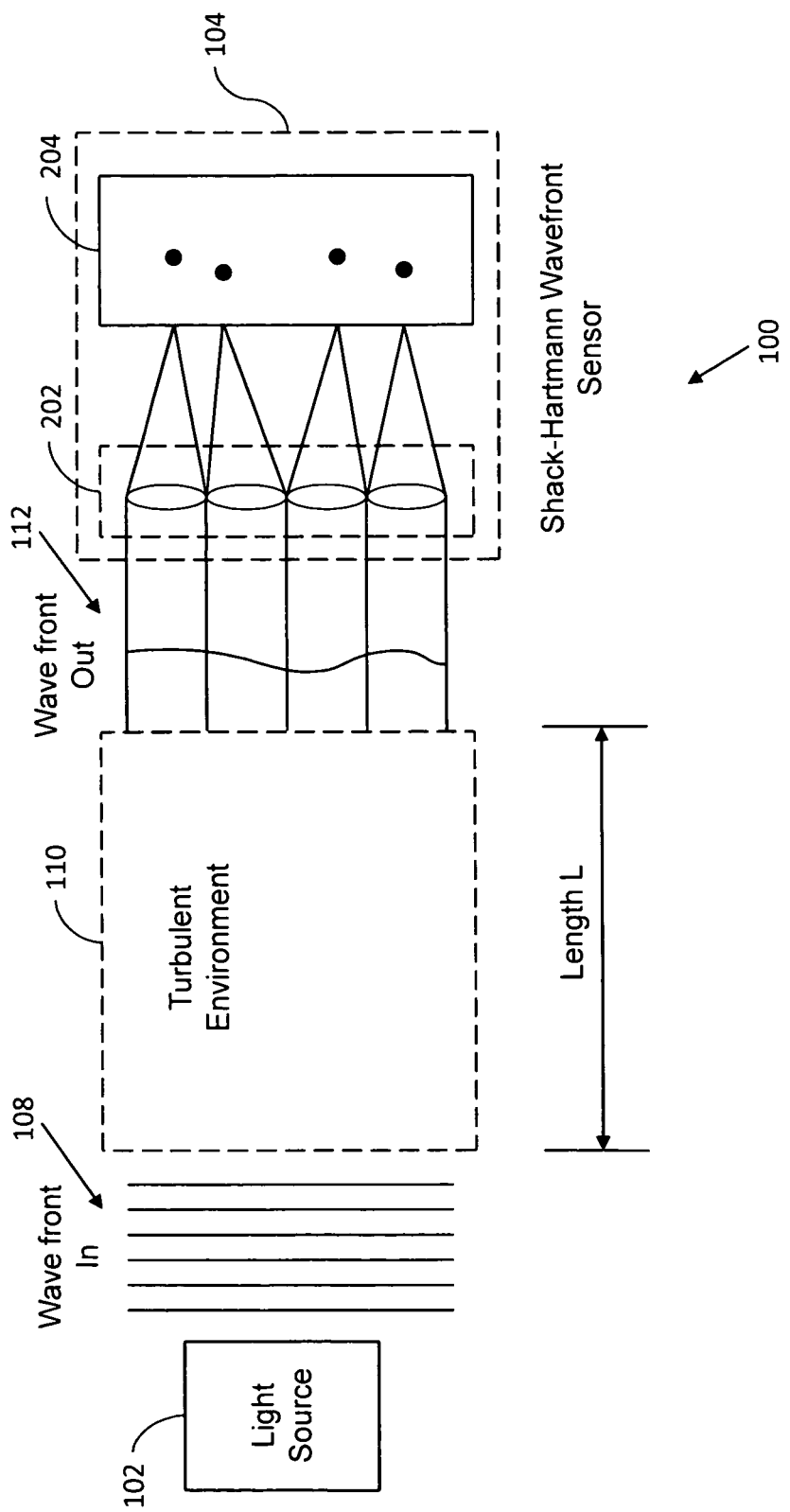
FIG. 2 is a block diagram illustrating a system for determining a rate of turbulent kinetic energy dissipation (TKED) in a turbulent fluid environment, in accordance with another embodiment of the present invention.
Figure 3:
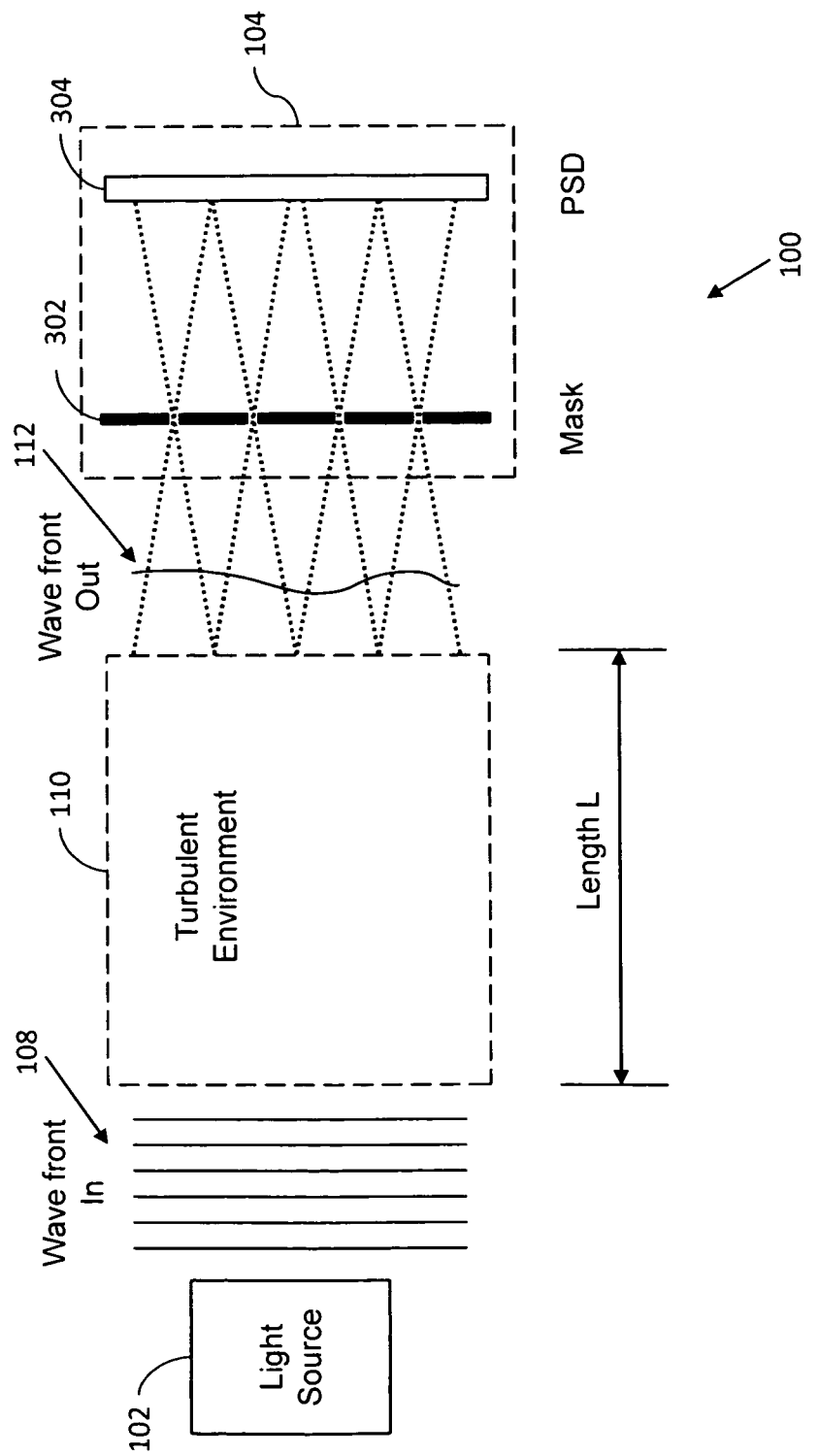
FIG. 3 is a block diagram illustrating a system for determining a rate of turbulent kinetic energy dissipation (TKED) in a turbulent fluid environment, in accordance with yet another embodiment of the present invention.
Figure 4:
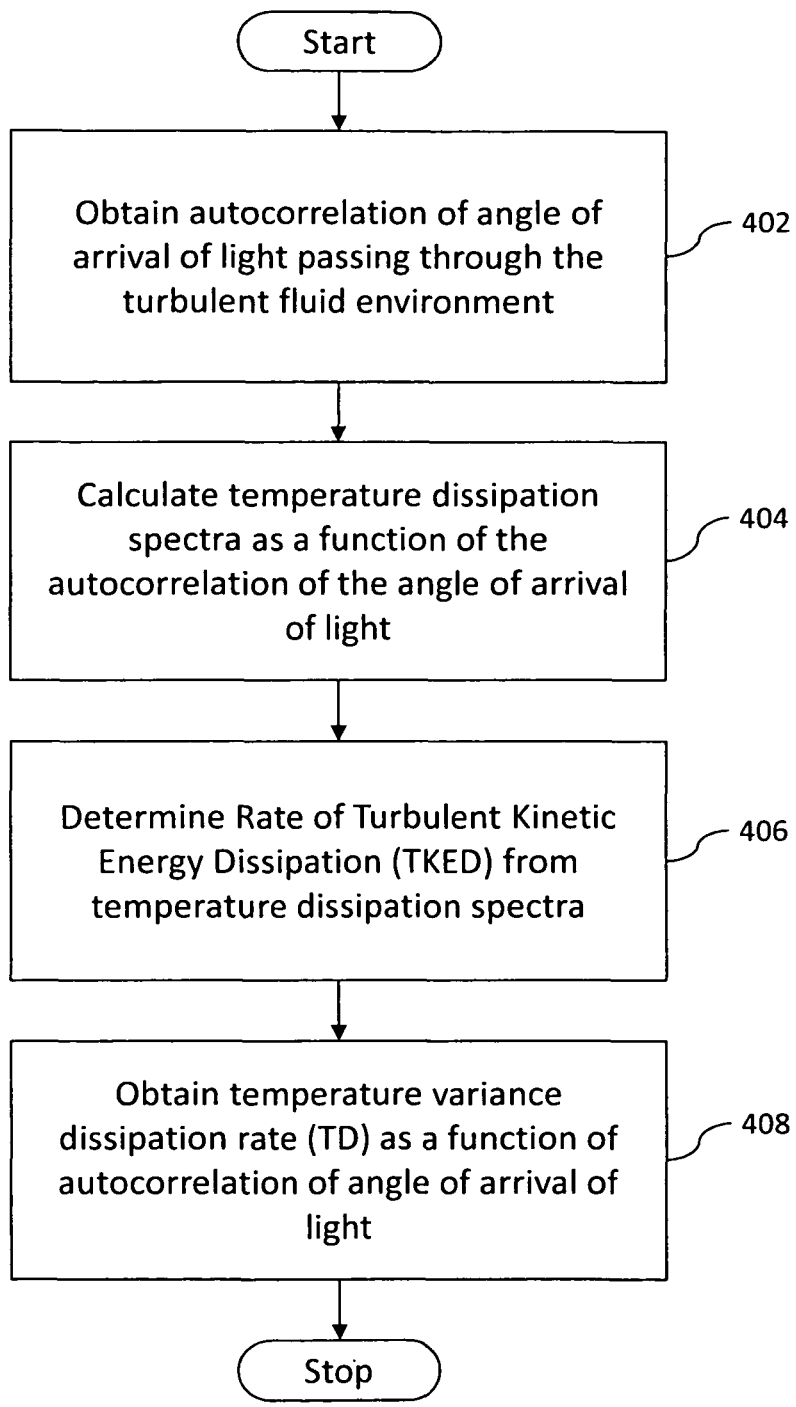
FIG. 4 is a flowchart illustrating a method for determining a rate of turbulent kinetic energy dissipation (TKED) in a turbulent fluid environment, in accordance with an embodiment of the present invention.

By mathematically processing the angle of arrival of light, the present invention calculates the temperature dissipation spectra and other turbulent quantities, theoretical basis and process for which is explained in detail in conjunction with FIG. 4. FIGS. 1 to 3 describe the system i.e. the hardware used in the turbulence measurement, in accordance with various embodiments of the present invention.

DEFINITIONS, ABBREVIATIONS AND ACRONYMS

Following are the definitions of the abbreviations and acronyms used in the patent specifications:
$\beta(\theta)$ Volume Scattering Function
$\epsilon$ Turbulent kinetic energy dissipation (TKED) rate
K Thermal conductivity of water at 20° C.~0.58 Wm$^{-1}$°C.$^{-1}$
$\nu$ Kinematic viscosity of water at 20° C.~1.005*10$^{-6}$ m$^2$s$^{-1}$
$X_e$ Turbulent thermal dissipation (TD) rate
dI($\theta$) Scattered radiant intensity
D Thermal diffusivity of water at 20° C.~1.42*10$^{-7}$ m$^2$s$^{-1}$
$E_\theta(k)$ Temperature spectrum
$E_0$ Incident irradiance
k Wavenumber
T Temperature
TD Turbulent thermal dissipation rate
TKED Turbulent kinetic energy dissipation rate
VSF Volume Scattering Function FIG. 1 is a block diagram illustrating a system 100 for determining a rate of turbulent kinetic energy dissipation (TKED) in a turbulent fluid environment, in accordance with an embodiment of the present invention. The system 100 includes a light source 102, an angle of arrival detection unit 104 and a processing unit 106. The light source 102 generates a beam of light that passes through a turbulent environment 110, along a path length L. The beam of light, after it passes through the turbulent environment 110 along the path length L, is captured at the angle of arrival detection unit 104. FIG. 1 shows a wave-front (in) 108 before the beam of light passes through the turbulent environment 110 and a wave-front (out) 108 after the beam of light leaves the turbulent environment 110. The angle of arrival detection unit detects and measures the angle of arrival and the processing unit 106 processes it to determine the rate of turbulent kinetic energy dissipation and various other turbulent quantities.

In an embodiment of the present invention, the light source 102 is a laser source such as a diode laser, a fiber laser, a semiconductor laser or a solid state laser. In another embodiment of the present invention, the light source 102 is an incandescent light source. It should be noted that the examples of the light source 102 here are mentioned for illustrative purpose only, and they do not restrict the scope of the invention in any way. Various other types of lasers and other sources of light can be used as the light source 102, without departing from the spirit and scope of the invention.

In an exemplary embodiment of the present invention, a 670 nm laser diode is used as the light source 102.

Optionally, before the light propagates through the turbulent medium 110, the light beam may be expanded and collimated. A person skilled in the art will appreciate that a suitable arrangement of an expander and an optical collimator (not shown) can be used for this purpose. By using such an arrangement, parallel waves of light may be obtained at infinity without any parallax, thus aiding easy facilitation of readings for processing.

In an embodiment of the present invention, the path length L through which the light beam propagates is 0.3 m. In various other embodiments of the present invention, the pathlength can be varied, and it does not restrict the scope of the invention in any way. An appropriate path length can be selected based on the design parameters of the system. The invention is equally applicable to any path length value between few millimeters (mm) (small eddy size or equivalent Kolmogorov length scale) and tens of kilometers (restricted typically by the fluid light attenuation—for sea water, it is typically few tens of meters, and for air flows, it is tens of km if no clouds are present).

Referring now to FIG. 2, the system 100 for determining a rate of turbulent kinetic energy dissipation (TKED) in a turbulent fluid environment, according to another embodiment of the present invention, is shown. In this embodiment of the present invention, the angle of arrival detection unit 104 includes a Shack-Hartmann wavefront sensor. The Shack-Hartmann wavefront sensor includes a lenslet arrangement 202 and a charge coupled device (CCD) 204. The lenslet arrangement 202 includes at least one lens (lenslet). In various embodiments of the invention, a number of lenses can be used in the lenslet arrangement 202. The light passing through the lenslet arrangement 202 is imaged at the CCD 204. Bright spots of light, equal to the number of lenses used in the lenslet arrangement 202, are observed at the CCD 204. The optical data collected by the CCD 204 is then processed at the processing unit 106 to determine the rate of turbulent kinetic energy dissipation (TKED) and various other turbulent quantities.

In an exemplary embodiment, 110 lenses are used in the lenslet arrangement 202, within a total length of 5 cm. The CCD 204 is a line scan CCD having a linear 8,000 pixel array. In this case, 100 bright spots are observed at the line scan CCD. The light intensity data is low-pass filtered to remove the effect of high frequency noise. The filtered data is transformed into an equivalent 2D spatial autocorrelation function (explained in detail in conjunction with FIG. 4) and converted into temperature dissipation spectra. The Shack-Hartmann array of this example is capable of measuring scattering angles from 0.3μ-rad to a few mili rad, and operated at the speed of 10,000 CCD readings per second.

In various embodiments of the present invention, a charge injection device (CID), CMOS imaging sensor or any other image sensors arrangement can be used in place of the CCD 204.

In an embodiment of the present invention, the lenslet arrangement 202 includes a single lenslet. Therefore, a single angle of arrival is obtained by the angle of arrival detection unit 104. The single angle of arrival is then processed by the processing unit 106, details of which are explained in conjunction with FIG. 4. The system 100, in this embodiment, is termed as 'single lenslet, single arrival angle turbulence sensor'.

Referring now to FIG. 3, the system 100 for determining a rate of turbulent kinetic energy dissipation (TKED) in a turbulent fluid environment, according to yet another embodiment of the present invention, is shown. In this embodiment of the present invention, the angle of arrival detection unit 104 includes an opaque mask 302 with a plurality of holes, and a position sensitive detector (PSD) 304. The light passes through the turbulent medium and the plurality of holes of the opaque mask 302. It is then collected and imaged at the PSD 304. The PSD 304 is any suitable arrangement, such as an optical position sensor (OPS) that measures the position of light spots in two dimensions. Examples of such PSDs include isotropic sensors, discrete sensors using parallel processing, discrete sensors using serial processing, and the like. The optical data collected by the PSD 304 is then processed at the processing unit 106 to determine the rate of turbulent kinetic energy dissipation and various other turbulent quantities.

In various embodiments of the present invention, the angle of arrival detection unit 104 can include a combination of the opaque mask 302 including a plurality of holes and the charge coupled device 204, a combination of the lenslet arrangement 202 and at the CCD 204, a combination of the lenslet arrangement 202 and the PSD 304, a combination the opaque mask 302 and the CCD 204, and a combination of the opaque mask and the PSD 304. Further, combinations of Charge Integrated Device (CID) or CMOS sensors with the lenslet arrangement 202 or the opaque mask 302 are also possible. It will be appreciated by a person skilled in the art that the invention is equally applicable to any known suitable mechanism for imaging the beam of light after it passes through the turbulent medium.

In addition, for the single lenslet single arrival turbulence sensor, with the single lenslet, the angle of arrival detection unit 104 can include one of the CCD 204, the CID, the CMOS sensor, or the PSD 304. The process for measurement of turbulent quantities by using the optical data imaged by the angle of arrival detection unit 104 is explained in detail in the forthcoming description.

FIG. 4 is a flowchart illustrating a method for determining a rate of turbulent kinetic energy dissipation (TKED) in a turbulent fluid environment, in accordance with an embodiment of the present invention. The imaging data obtained from the angle of arrival detection unit 104 is used to calculate the arrival angle along the X axis. For this, the raw imaging data obtained from the angle of arrival detection unit 104 is enlarged and cleaned up by using an appropriate digital filter. In an embodiment of the present invention, a nonrecursive lowpass filter centered around the wave number where the distortion occurs is used. An autocorrelation of the angle of arrival of light is obtained at step 402. The autocorrelation $\varphi^2(d)$ of the angle of arrival of light ($\theta$) is obtained by using the equation:

$$\varphi^2(d) = \text{Constant1} * \int_0^{2\pi} d\theta \cdot \sin\theta \cdot VSF(\theta) \cdot g_\varphi(\theta) \cdot J_0\left(\frac{2\pi}{\lambda} d \sin(\theta)\right)$$

where $VSF(\theta)$ is a volume scattering function obtained as a function of a time series of a scattering angle of light, and $g_\varphi(\theta)$ is a fudge function obtained by using historical turbulence measurement data.

In an embodiment of the invention, the constant1 is $2\pi$, and when all the units are taken in SI measurement system. A person skilled in the art will understand that the value of this constant can be appropriately selected, depending on the units used in the measurements.

In an embodiment of the invention, the volume scattering function VSF(θ) is obtained by using the following equation:

$$VSF(\theta) = \frac{dI(\theta)}{EdV}$$

where I is a radiant intensity of light scattered at the angle θ, E is an incident irradiance of light, V is a scattering volume and F is a radiant flux.

In an embodiment of the present invention, when the single lenslet single arrival angle optical sensor is used, the volume scattering function is calculated by a time series of the angle of arrival of the light beam.

The fudge function $g_\phi(\theta)$ is obtained by using historical data obtained from the past measurements—for example, measurement techniques used by Bogucki et. al, titled "Optical measurement of rates of dissipation of temperature variance due to oceanic turbulence", Optics Express 2007, entire contents of which are herein incorporated by reference. The procedure for evaluating of the fudge function is based on determining all quantities in the equation independently (i.e. VSF(θ) and $\phi^2(d)$) and then numerically inverting the equation below via integral Bessel transform to find the fudge function $g_\phi(\theta)$.

$$\varphi^2(d) = \text{Constant1} * \int_0^{2\pi} d\theta \cdot \sin\theta \cdot VSF(\theta) \cdot g_\varphi(\theta) \cdot J_0\left(\frac{2\pi}{\lambda} d\sin(\theta)\right)$$

Thereafter, a Fourier transform ($\Phi(k_1)$) of the autocorrelation of the angle of arrival of the light beam is obtained. The procedure for obtaining a Fourier transform is fairly well known, and is therefore omitted from the current description.

At step 404, the temperature dissipation spectra are calculated as a function of the Fourier transform ($\Phi(k_1)$) of the autocorrelation of the angle of arrival of light. The temperature dissipation spectra $E_\theta(k)$ is calculated by using the equation:

$$E_\theta(k) = \text{Constant2} * \int_k^\infty k_1 \frac{\frac{d}{dk_1}\left(\frac{\phi(k_1)}{k_1}\right)}{\sqrt{k_1^2 - k^2}} dk_1$$

In an embodiment of the invention, the constant2 is $$-\frac{2}{\pi L},$$

where L is the path length along which the light beam travels in the turbulent medium, and when all the units are taken in SI measurement system. A person skilled in the art will understand that the value of this constant can be appropriately selected, depending on the units used in the measurements.

Figure 5:
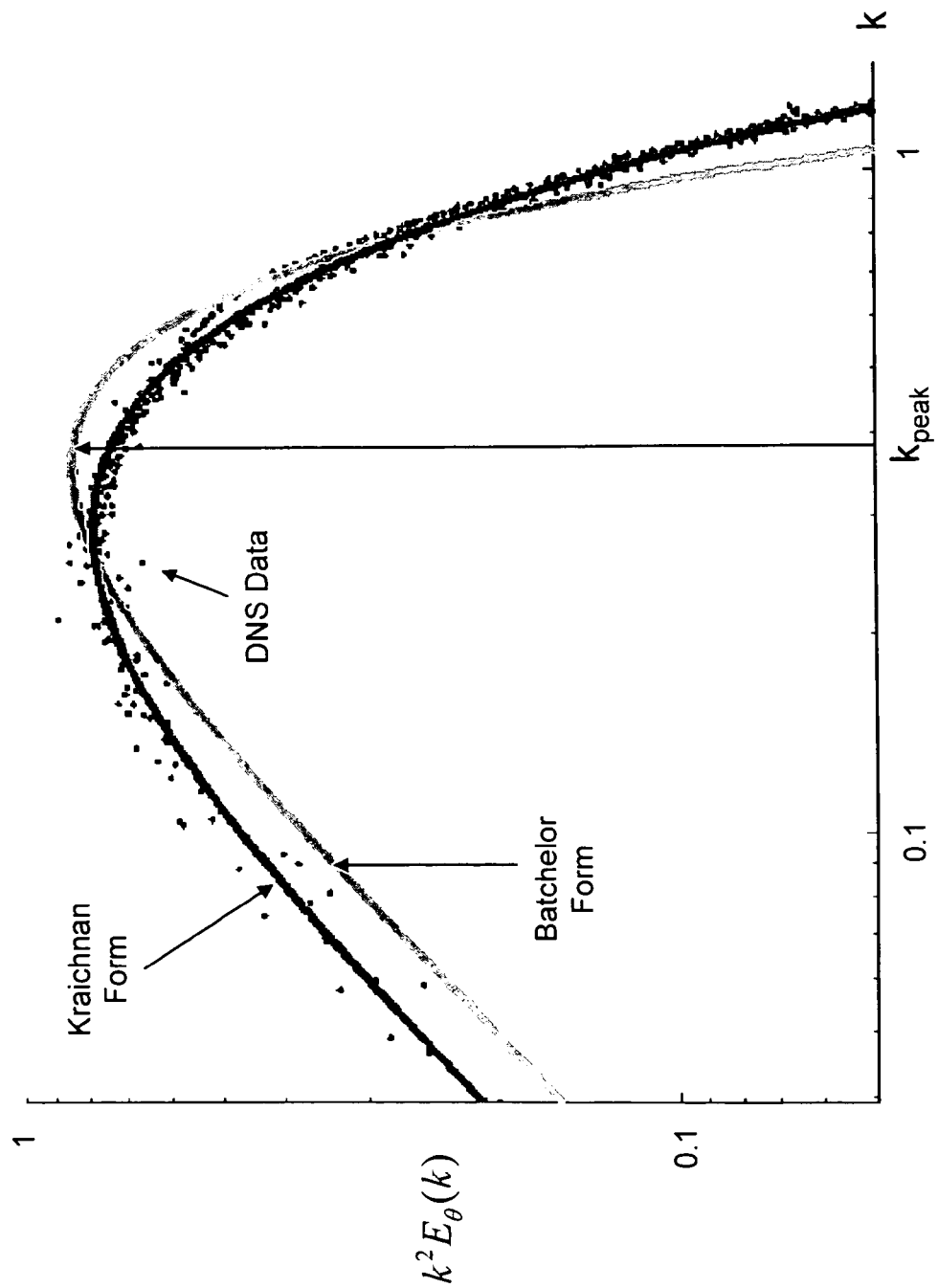
FIG. 5 is a graph illustrating a universal plot between wavenumber (k) and the temperature dissipation spectra ($k^2 E_\theta(k)$) used to locate a maximum dissipation value at a corresponding wavenumber k, in accordance with various embodiments of the present invention.

The rate of turbulent kinetic energy dissipation (TKED) is calculated by using the temperature dissipation spectra, at step 406. Referring now to FIG. 5, a plot between wave number (k) and the temperature dissipation spectra ($k^2E_\theta(k)$) is shown. The graph in FIG. 5 also shows the plots obtained by theoretical measurements such as Kraichnan form and Batchelor form. The peak value of the plot at the associated wavenumber is related to the rate of turbulent kinetic energy dissipation (TKED) as:

$$k = 2\pi\left(\frac{v^3}{TKED}\right)^{1/4}$$

Referring to FIG. 4, at step 408, a temperature variance dissipation rate (TD) is obtained. In an embodiment of the present invention, the temperature variance dissipation rate (TD), χ, is calculated by using the equation:

$$\chi = 2\kappa \int_0^\infty k^2 E_\theta(k) dk$$

The TD is a key quantity when calculating heat fluxes, spreading of contaminants or parameterizing fluxes in the turbulent medium.

Figure 6:
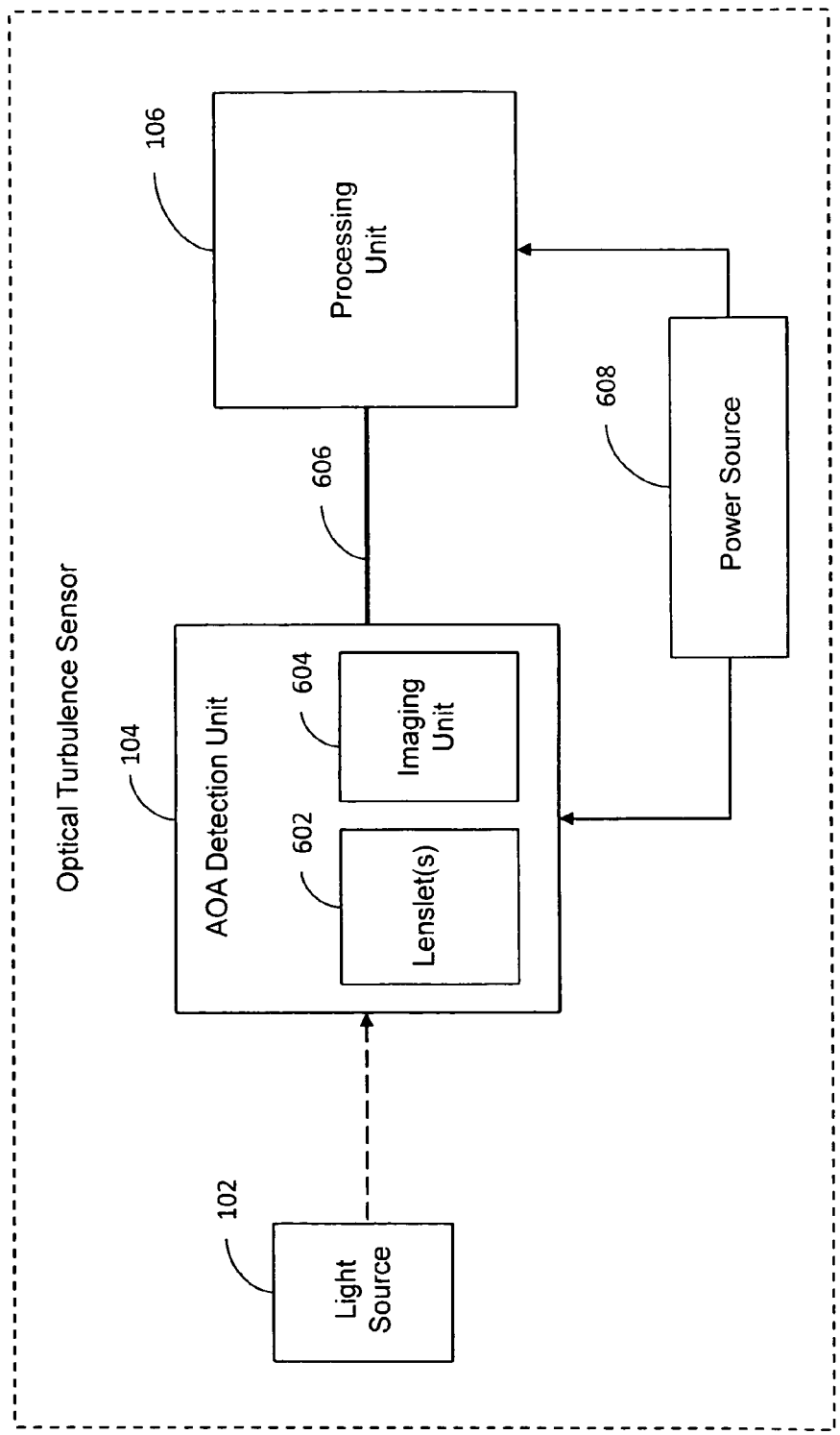
FIG. 6 is a block diagram illustrating an optical turbulence senor, in accordance with various embodiments of the present invention.

FIG. 6 is a block diagram illustrating an optical turbulence senor 600, in accordance with various embodiments of the present invention. The optical turbulence sensor 600 includes the light source 102, the angle of arrival detection unit 104, the processing unit 106 and a power source 608. The working and various embodiments of the light source 102, angle of arrival detection unit 104 and the processing unit 106 have already been explained in detail in conjunction with FIGS. 1, 2 and 3.

In one embodiment of the present invention, the angle of arrival detection unit includes a single lenslet 602. The beam of light originated from the light source 102 passes through the lenslet 602 and is collected at the imaging unit 604. In various embodiments of the invention, the imaging unit 604 can be a charge coupled device (CCD), a position sensitive detector (PSD), a charge integrated device (CID) or a CMOS sensor. The optical turbulence sensor may include any number of lenslets 602, and corresponding angle of arrival detection arrangements as explained in conjunction with FIGS. 1 and 2.

The processing unit 106 is configured for carrying out the method for determining a rate of turbulent kinetic energy dissipation (TKED) and other turbulent quantities, as described in conjunction with FIG. 4.

The angle of arrival unit 104 is connected with the processing unit 106 by means of a transmission cable arrangement 606. The transmission cable arrangement 606 transmits data, i.e. optical signals between the angle of arrival detection unit 102 and the processing unit 106. In various embodiments of the present invention, the transmission cable arrangement includes an optical fiber connector such as an LC connector, and a data transmission cable, such as a PCCM cable. Various other optical connectors, such as ST, MT-RJ, MPO, LC, SC, MPO, etc. and data transmission cables such as optical fiber cables, telecommunications cables or Ethernet cables may also be used, and it does not restrict the scope of the invention in any way.

In an embodiment of the invention, when the optical turbulence sensor is used to detect the turbulence in an ocean, the angle of arrival detection unit 104 may be kept under the water and the processing unit 106 may be at a remote station. In various other embodiments of the present invention, the angle of arrival detection unit 104 and the processing unit 106 may be integrated in a single unit.

A power source 608 is provided to power the processing unit 106 and the angle of arrival detection unit 104. The power source 608 maybe a battery such as a lithium ion battery, a lead acid battery, a nickel cadmium battery; a fuel cell; a renewable energy power source such as a solar, wind or tidal power source; an electrical power source, such as an AC source or DC source; or an electromechanical power source such as a generator or an alternator. Separate power sources

608 may be used to provide power to the angle of arrival detection unit 104 and the processing unit 106.

The optical turbulence sensor can be used for direct turbulence measurements in fluids including water, air and gases. Following are some of the exemplary applications of the turbulence sensor: detection and measurement of oceanographic turbulence, air turbulence, air drag over wings of an airplane, water quality, oceanic dispersion of pollutants, optical propagation conditions in water, turbulent wake behind body moving in water, oceanic flow turbulent kinetic energy, air quality, atmospheric dispersion, optical propagation conditions in air, surface thermal energy balance, turbulence generated by wind turbines, stall conditions on an airplane, state of turbulent wake behind wings of an airplane; and optimizing at least one of multiple turbine locations, and output from a multiple wind turbine system. It should be noted that as such, the optical turbulence sensor may be used in any known application of direct turbulence measurement in any turbulent fluid.

In an exemplary embodiment of the present invention, the optical turbulence sensor 600 was developed with the following specifications:
  Measurement of light beam forward scatter between 0.1 μrad and few mrad
  $\chi$ range from $10^{-1}$ deg C.$^2$/sec to $10^{-9}$ deg C.$^2$/sec
  $\epsilon$ range from $10^{-4}$ m$^2$/sec$^3$ to $10^{-10}$ m$^2$/sec$^3$
  Time to obtain a single temperature spectrum: 6 to 15 μsec
  Acquisition time for stable temperature spectra: ~5 msec
  Measurement of flow velocity from 0.1 mm/sec to few m/sec However, it should be noted that the specification mentioned here are exemplary. The method can be used to develop sensors with various other specifications, depending on the turbulence measurement requirements.

The optical turbulence sensor and single lens single arrival angle turbulence sensor of the present invention have one or more of the following advantages. The sensors can be used for direct determination of one or more turbulent quantities in a turbulent fluid environment, as explained in the foregoing description. The sensors are non-invasive in nature and entail lower costs of manufacturing. The hardware that is used is minimum and inexpensive. The sensors are applicable in a number of turbulent fluid environments and under varying physical conditions. Moreover, the data processing involved in the method is minimal.

In general, the various embodiments of the present invention may be implemented in hardware or special purpose circuits, software, logic, or any combination thereof. For example, some aspects may be implemented in hardware, while other aspects may be implemented in firmware or software which may be executed by a processor, such as a controller, microprocessor or other computing device, although the invention is not limited thereto. While various aspects of the invention may be illustrated and described as block diagrams or flow charts, it will be understood that these blocks, apparatus, systems, techniques or methods described herein may be implemented in, as non-limiting examples, hardware, software, firmware, special purpose circuits or logic, general purpose hardware or controller or other computing devices, or some combination thereof.

Thus, the present invention has been described herein with reference to a particular embodiment for a particular application. Although selected embodiments have been illustrated and described in detail, it may be understood that various substitutions and alterations are possible. Those having ordinary skill in the art and access to the present teachings may recognize additional various substitutions and alterations are also possible without departing from the spirit and scope of the present invention, and as defined by the following claims.

What is claimed is:

1. A method for determining a rate of turbulent kinetic energy dissipation (TKED) in a turbulent fluid environment, the method comprising:
  providing a light source a first end of a predetermined path-length (L), for passing at least one beam of light through the turbulent fluid environment;
  using an angle of arrival detection unit for detecting an angle of arrival of the at least one beam of light wherein the angle of arrival detection unit includes a single lenslet; and by using at least one processor:
  obtaining an autocorrelation of an angle of arrival of light $\varphi^2(d)$ passing through the turbulent fluid environment and along a predetermined path-length (L), by using the equation:

$$\varphi^2(d) = 2\pi \int_0^{2\pi} d\theta \cdot \sin\theta \cdot VSF(\theta) \cdot g_\varphi(\theta) \cdot J_0\left(\frac{2\pi}{\lambda} d\sin(\theta)\right)$$

wherein $\theta$ is an angle of arrival of the light, VSF($\theta$) is a volume scattering function obtained as a function of a time series of a scattering angle of light and $g_\varphi(\theta)$ is an universal fudge function obtained by using historical turbulence measurement data, $J_0$ is a Bessel function of the first kind, $\lambda$ is a wavelength of light and d is an independent variable of the equation describing a relationship between the angle of arrival of light and the volume scattering function; and
  calculating a temperature spectra $E_\theta(k)$ as a function of the Fourier transform of the angle of arrival of light $\varphi^2(d)$ by using the equation:

$$E_\theta(k) = -\frac{2}{\pi L} \int_k^\infty k_1 \frac{\frac{d}{dk_1}\left(\frac{\phi(k_1)}{k_1}\right)}{\sqrt{k_1^2 - k^2}} dk_1$$

wherein $\Phi(k_1)$ is a Fourier transform of the autocorrelation of the angle of arrival of light—k is a wavenumber, and $k_1$ is a variable wavenumber, and wherein the peak of the temperature dissipation spectra represents the rate of TKED.

2. The method according to claim 1, wherein the VSF is calculated by using the equation:

$$VSF(\theta) = \frac{1}{E}\frac{dI(\theta)}{dV}$$

wherein dI is a radiant intensity scattered or arriving at an angle $\theta$, E is an incident irradiance, and dV is a scattering volume.

3. The method according to claim 1, wherein the angle of arrival of light is obtained by using a Shack-Hartmann wave front sensor.

4. The method according to claim 1 further comprising obtaining a temperature variance dissipation rate (TD) as a function of the autocorrelation of the angle of arrival of light.

5. A system for determining a rate of turbulent kinetic energy dissipation (TKED) in a turbulent fluid environment, the system comprising:

a light source provided at a first end of a predetermined path-length (L), for passing at least one beam of light through the turbulent fluid environment;

an angle of arrival detection unit for detecting an angle of arrival of the at least one beam of light, wherein the angle of arrival detection unit includes a single lenslet; and a processing unit configured for:

obtaining an autocorrelation of the angle of arrival of the at least one beam of light, $\varphi^2(d)$, by using the equation:

$$\varphi^2(d) = 2\pi \int_0^{2\pi} d\theta \cdot \sin\theta \cdot VSF(\theta) \cdot g_\varphi(\theta) \cdot J_0\left(\frac{2\pi}{\lambda} d\sin(\theta)\right)$$

wherein $J_0$ is a Bessel function of the first kind, $\lambda$ is a wavelength of light and d is an independent variable of the equation describing a relationship between the angle of arrival of light and the volume scattering function; and $g_\varphi(\theta)$ is an universal fudge function obtained by using historical turbulence measurement data; and calculating a temperature dissipation spectra as a function of the autocorrelation of the angle of arrival of the at least one beam of light, by using the equation:

$$E_\theta(k) = -\frac{2}{\pi L} \int_k^\infty k_1 \frac{\frac{d}{dk_1}\left(\frac{\phi(k_1)}{k_1}\right)}{\sqrt{k_1^2 - k^2}} dk_1$$

wherein $\Phi(k_1)$ is a Fourier transform of the autocorrelation of the angle of arrival of the at least one beam of light—$\varphi^2(d)$, k is a wavenumber, and $k_1$ is a variable wavenumber, and wherein the peak of the temperature dissipation spectra represents the rate of TKED.

6. The system according to claim 5, wherein the processing unit is further configured for:

calculating a volume scattering function $VSF(\theta)$ as a function of a time series of a scattering angle of the at least one beam of light, wherein $\theta$ is an angle of arrival of the light; and calculating a universal fudge function $g_\varphi(\theta)$ from historical turbulence measurement data.

7. The system according to claim 5, wherein the angle of arrival detection unit comprises one of a Shack-Hartmann wavefront sensor, a combination of an opaque mask including a plurality of holes and a position sensitive detector (PSD), a combination of at least one lenslet and at least one charge coupled device (CCD or CMOS), a combination of at least one lenslet and a position sensitive detector (PSD), a combination of an opaque mask including a plurality of holes and at least one charge coupled device (CCD), and a combination of an opaque mask including a plurality of holes and a position sensitive detector (PSD).

8. The system according to claim 5 further comprising a memory for storing real time and historical values of at least one of the angle of arrival of the light beam, the autocorrelation of the angle of arrival of the light beam, the predetermined path-length, a volume scattering function, a radiant intensity scattered at an angle, an incident irradiance, a scattering volume, a radiant flux, a fudge function, a temperature dissipation spectra, a temperature variance dissipation rate, and the rate of turbulent kinetic energy dissipation.

9. The system according to claim 5 is used in measuring at least one of oceanographic turbulence, air turbulence, air drag over wings of an airplane, water quality, oceanic dispersion of pollutants, optical propagation conditions in water, turbulent wake behind body moving in water, oceanic flow turbulent kinetic energy, air quality, atmospheric dispersion, optical propagation conditions in air, surface thermal energy balance, turbulence generated by wind turbines, stall conditions on an airplane, state of turbulent wake behind wings of an airplane; and optimizing at least one of multiple turbine locations, and output from a multiple wind turbine system.

10. A single lenslet, single arrival angle turbulence sensor comprising:

a light source provided at a first end of a predetermined path-length (L), for passing a beam of light through a turbulent fluid environment;

an angle of arrival detection unit comprising:

a single lenslet positioned at a second end of the predetermined path-length; and an imaging unit for imaging the beam of light after the beam of light passes through the single lenslet; and a processing unit configured for:

obtaining an autocorrelation of an angle of arrival of the beam of light $\varphi^2(d)$ passing through the turbulent fluid environment and along the predetermined path-length (L), by using the equation:

$$\varphi^2(d) = 2\pi \int_0^{2\pi} d\theta \cdot \sin\theta \cdot VSF(\theta) \cdot g_\varphi(\theta) \cdot J_0\left(\frac{2\pi}{\lambda} d\sin(\theta)\right)$$

wherein $\theta$ is an angle of arrival of the light, $VSF(\theta)$ is a volume scattering function obtained as a function of a time series of a scattering angle of light and $g_\varphi(\theta)$ is an universal fudge function obtained by using historical turbulence measurement data, $J_0$ is a Bessel function of the first kind, $\lambda$ is a wavelength of light and d is an independent variable of the equation describing a relationship between the angle of arrival of light and the volume scattering function; and calculating a temperature spectra $E_\theta(k)$ as a function of the angle of arrival of the beam of light by using the equation:

$$E_\theta(k) = -\frac{2}{\pi L} \int_k^\infty k_1 \frac{\frac{d}{dk_1}\left(\frac{\phi(k_1)}{k_1}\right)}{\sqrt{k_1^2 - k^2}} dk_1$$

wherein $\Phi(k_1)$ is a Fourier transform of the autocorrelation of the angle of arrival of light—$\varphi^2(d)$, k is a wavenumber, and $k_1$ is a variable wavenumber.

11. The single lenslet, single arrival angle turbulence sensor according to claim 10, wherein the imaging unit comprises one of a position sensitive detector (PSD), at least one charge coupled device (CCD), a CMOS imaging sensor and at least one charge injection device (CID).

12. The single lenslet, single arrival angle turbulence sensor according to claim 10, wherein the VSF is calculated by using the equation:

$$VSF(\theta) = \frac{1}{E} \frac{dI(\theta)}{dV}$$

wherein dI is a radiant intensity scattered at an angle $\theta$, E is an incident irradiance, and dV is a scattering volume.

13. The single lenslet, single arrival angle turbulence sensor according to claim 10, wherein the processing unit is further configured for obtaining a temperature variance dissipation rate (TD) as a function of the autocorrelation of the angle of arrival of the beam of light.

14. The single lenslet, single arrival angle turbulence sensor according to claim 10 further comprising a memory for storing real time and historical values of at least one of the angle of arrival of the light beam, the autocorrelation of the angle of arrival of the light beam, the predetermined pathlength, the volume scattering function, a radiant intensity scattered at an angle, an incident irradiance, a scattering volume, a radiant flux, the fudge function, the temperature dissipation spectra, a temperature variance dissipation rate, and the rate of turbulent kinetic energy dissipation.

15. The single lenslet, single arrival angle turbulence sensor according to claim 10 is used in measuring at least one of oceanographic turbulence, air turbulence, air drag over wings of an airplane, water quality, oceanic dispersion of pollutants, optical propagation conditions in water, turbulent wake behind body moving in water, oceanic flow turbulent kinetic energy, air quality, atmospheric dispersion, optical propagation conditions in air, surface thermal energy balance, turbulence generated by wind turbines, stall conditions on an airplane, state of turbulent wake behind wings of an airplane; and optimizing at least one of multiple turbine locations, and output from a multiple wind turbine system.

16. The single lenslet, single arrival angle turbulence sensor according to claim 10 further comprising at least one transmission cable arrangement for transferring optical data between the imaging unit and the processing unit.

17. The single lenslet, single arrival angle turbulence sensor according to claim 10 further comprising a power source for providing power to the processing unit and the imaging unit.

* * * * *